(12) United States Patent
Harleman

(10) Patent No.: US 12,618,429 B2
(45) Date of Patent: May 5, 2026

(54) ECCENTRIC BOLT FOR ATTACHING MISSION POD TO AIRCRAFT

(71) Applicant: The Boeing Company, Chicago, IL (US)

(72) Inventor: Thomas J. Harleman, Maple Valley, WA (US)

(73) Assignee: The Boeing Company, Arlington, VA (US)

( * ) Notice: Subject to any disclaimer, the term of this patent is extended or adjusted under 35 U.S.C. 154(b) by 1108 days.

(21) Appl. No.: 17/551,599

(22) Filed: Dec. 15, 2021

(65) Prior Publication Data

US 2022/0235815 A1      Jul. 28, 2022

Related U.S. Application Data

(60) Provisional application No. 63/141,437, filed on Jan. 25, 2021.

(51) Int. Cl.
| | |
|---|---|
| *F16B 35/04* | (2006.01) |
| *B64D 7/00* | (2006.01) |
| *F16C 11/04* | (2006.01) |
| *F16C 11/06* | (2006.01) |

(52) U.S. Cl.
CPC .............. *F16B 35/041* (2013.01); *B64D 7/00* (2013.01); *F16C 11/045* (2013.01); *F16C 11/0614* (2013.01)

(58) Field of Classification Search
CPC ...... F16B 35/041; F16B 5/025; F16B 5/0225; B64D 7/00

USPC ................................................ 411/424, 426
See application file for complete search history.

(56) References Cited

U.S. PATENT DOCUMENTS

| | | | | | |
|---|---|---|---|---|---|
| 2,509,285 | A | * | 5/1950 | Bendicsen | F16B 7/18 403/97 |
| 4,444,365 | A | * | 4/1984 | Heuberger | F16C 11/045 403/DIG. 7 |
| 5,813,788 | A | * | 9/1998 | Yamamoto | F16D 3/78 464/134 |
| 6,047,789 | A | * | 4/2000 | Iwanaga | B62D 17/00 280/86.756 |
| 6,068,275 | A | * | 5/2000 | Chino | B60G 9/02 280/124.112 |
| 6,302,416 | B1 | * | 10/2001 | Schmack | B60G 15/07 280/86.754 |
| 6,514,002 | B1 | * | 2/2003 | Katae | F16C 33/02 403/150 |
| 6,904,641 | B2 | * | 6/2005 | Magoto | B60B 33/04 16/DIG. 34 |

(Continued)

*Primary Examiner* — Flemming Saether

(57) ABSTRACT

Systems and methods are provided for eccentric bolt. One embodiment is an eccentric bolt to secure a clevis and lug fitting. The eccentric bolt includes a head and a shank. The shank includes multiple shank sections that successively decrease in diameter in an axial direction from the head toward a tail end of the shank. One of the shank sections is an eccentric shank section that is off-center with respect to a center axis of the shank. The eccentric shank section is configured to engage the lug prior to engagement of concentric shank sections with the clevis. While the eccentric shank section is engaged with the lug, the shank is configured to rotate to align the concentric shank sections with the clevis, and to insert through the clevis and lug fitting to compensate for misalignment of the clevis and lug fitting.

20 Claims, 8 Drawing Sheets

(56)           References Cited

U.S. PATENT DOCUMENTS

| | | | |
|---|---|---|---|
| 10,351,224 B2 * | 7/2019 | Harleman | B64C 7/00 |
| 11,293,465 B2 * | 4/2022 | Brindeau | B64C 1/18 |
| 11,608,855 B2 * | 3/2023 | Harleman | F16C 11/045 |

* cited by examiner

FIG. 4

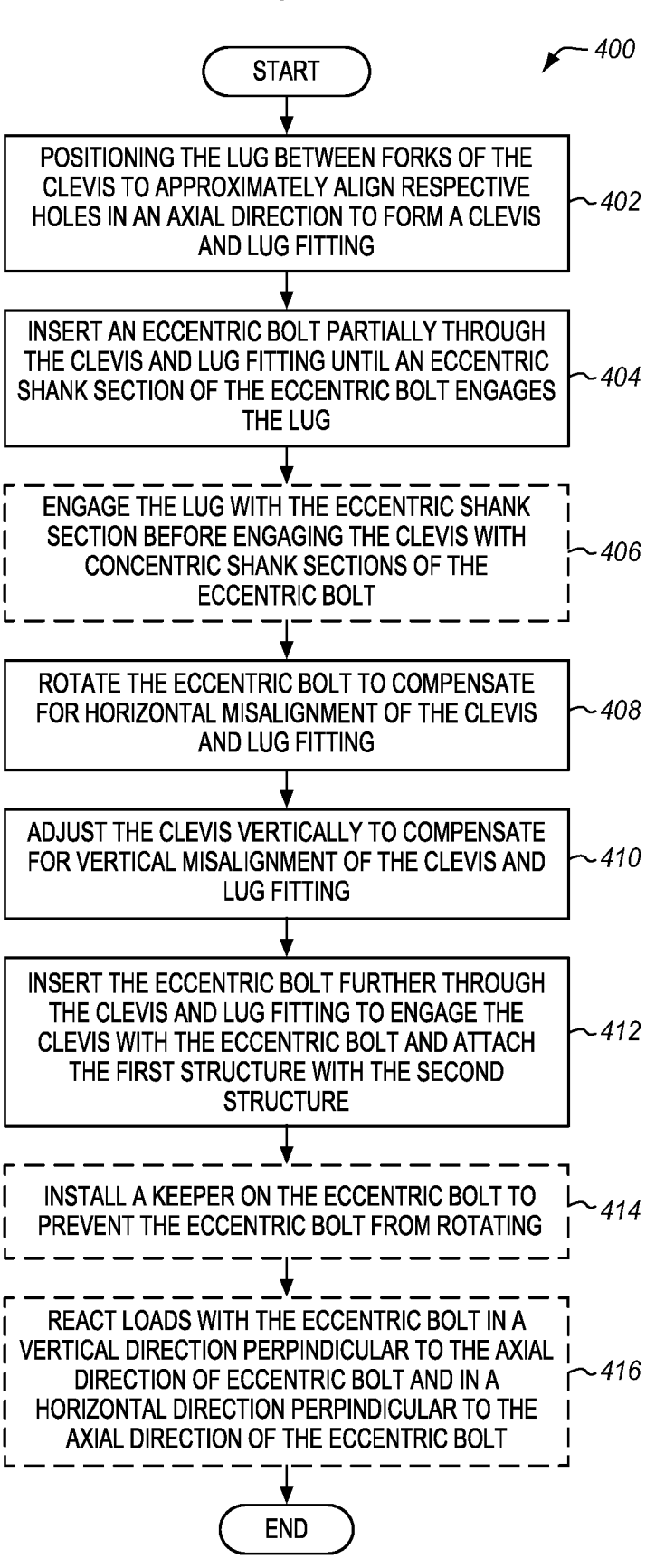

400

START

POSITIONING THE LUG BETWEEN FORKS OF THE CLEVIS TO APPROXIMATELY ALIGN RESPECTIVE HOLES IN AN AXIAL DIRECTION TO FORM A CLEVIS AND LUG FITTING ~402

INSERT AN ECCENTRIC BOLT PARTIALLY THROUGH THE CLEVIS AND LUG FITTING UNTIL AN ECCENTRIC SHANK SECTION OF THE ECCENTRIC BOLT ENGAGES THE LUG ~404

ENGAGE THE LUG WITH THE ECCENTRIC SHANK SECTION BEFORE ENGAGING THE CLEVIS WITH CONCENTRIC SHANK SECTIONS OF THE ECCENTRIC BOLT ~406

ROTATE THE ECCENTRIC BOLT TO COMPENSATE FOR HORIZONTAL MISALIGNMENT OF THE CLEVIS AND LUG FITTING ~408

ADJUST THE CLEVIS VERTICALLY TO COMPENSATE FOR VERTICAL MISALIGNMENT OF THE CLEVIS AND LUG FITTING ~410

INSERT THE ECCENTRIC BOLT FURTHER THROUGH THE CLEVIS AND LUG FITTING TO ENGAGE THE CLEVIS WITH THE ECCENTRIC BOLT AND ATTACH THE FIRST STRUCTURE WITH THE SECOND STRUCTURE ~412

INSTALL A KEEPER ON THE ECCENTRIC BOLT TO PREVENT THE ECCENTRIC BOLT FROM ROTATING ~414

REACT LOADS WITH THE ECCENTRIC BOLT IN A VERTICAL DIRECTION PERPINDICULAR TO THE AXIAL DIRECTION OF ECCENTRIC BOLT AND IN A HORIZONTAL DIRECTION PERPINDICULAR TO THE AXIAL DIRECTION OF THE ECCENTRIC BOLT ~416

END

ECCENTRIC BOLT FOR ATTACHING MISSION POD TO AIRCRAFT

RELATED APPLICATIONS

This non-provisional patent application claims priority to U.S. Provisional Patent Application No. 63/141,437 filed on Jan. 25, 2021, which is incorporated by reference as if fully provided herein.

FIELD

The disclosure relates to the field of fasteners, and in particular, to an eccentric bolt.

BACKGROUND

Some aircraft, such as military aircraft, may be equipped with so-called mission pods that detachably secure to an external surface of the aircraft. The pods may house various components or payload that facilitate execution of various operations. For example, a pod may carry electronics for mission-specific communications or surveillance. It is generally beneficial for the pods to be easily swapped on the aircraft for mission adaptability. Additionally, it is beneficial for the pods to attach with different aircraft in a manner that is secure and aligned despite manufacturing tolerance differences among aircraft.

SUMMARY

Embodiments described herein use an eccentric bolt for attaching a mission pod to an aircraft. The eccentric bolt is inserted through a joint, such as a clevis and lug fitting, that attaches a mission pod with the external surface of the aircraft. Due to manufacturing tolerances of the aircraft, two joints of the aircraft for attaching a pod may be slightly misaligned. The eccentric bolt advantageously enables fine adjustment in one of the joints to correct or compensate for the misalignment between the aircraft and the pod mounting fittings. Moreover, the eccentric bolt facilitates quick, secure attachment of the mission pod to the aircraft in a compact size without drilling.

One embodiment is an eccentric bolt to secure a clevis and lug fitting. The eccentric bolt includes a head and a shank. The shank includes multiple shank sections that successively decrease in diameter in an axial direction from the head toward a tail end of the shank. One of the shank sections is an eccentric shank section that is off-center with respect to a center axis of the shank. The eccentric shank section is configured to engage the lug prior to engagement of concentric shank sections with the clevis. While the eccentric shank section is engaged with the lug, the shank is configured to rotate to align the concentric shank sections with the clevis, and to insert through the clevis and lug fitting to compensate for misalignment of the clevis and lug fitting.

A further embodiment is a method of attaching a first structure having a clevis to a second structure having a lug. The method includes positioning the lug between forks of the clevis to approximately align respective holes in an axial direction to form a clevis and lug fitting, and inserting an eccentric bolt partially through the clevis and lug fitting until an eccentric shank section of the eccentric bolt engages the lug. The method also includes rotating the eccentric bolt to compensate for horizontal misalignment of the clevis and lug fitting, and adjusting the clevis vertically to compensate for vertical misalignment of the clevis and lug fitting. The method further includes inserting the eccentric bolt further through the clevis and lug fitting to engage the clevis with the eccentric bolt and attach the first structure with the second structure.

A further embodiment is a method of attaching a mission pod with an aircraft. The method includes attaching a first end of the mission pod to the aircraft by installing a first straight bolt through a first joint, and attaching a second end of the mission pod to the aircraft by installing a second straight bolt through a second joint. The method also includes attaching the first end of the mission pod to the aircraft by installing an eccentric bolt through a third joint to compensate for misalignment between the first joint and the third joint.

Other example embodiments may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 4 is a flow chart illustrating a method of attaching a first structure having a clevis to a second structure having a lug in an illustrative embodiment.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1A:
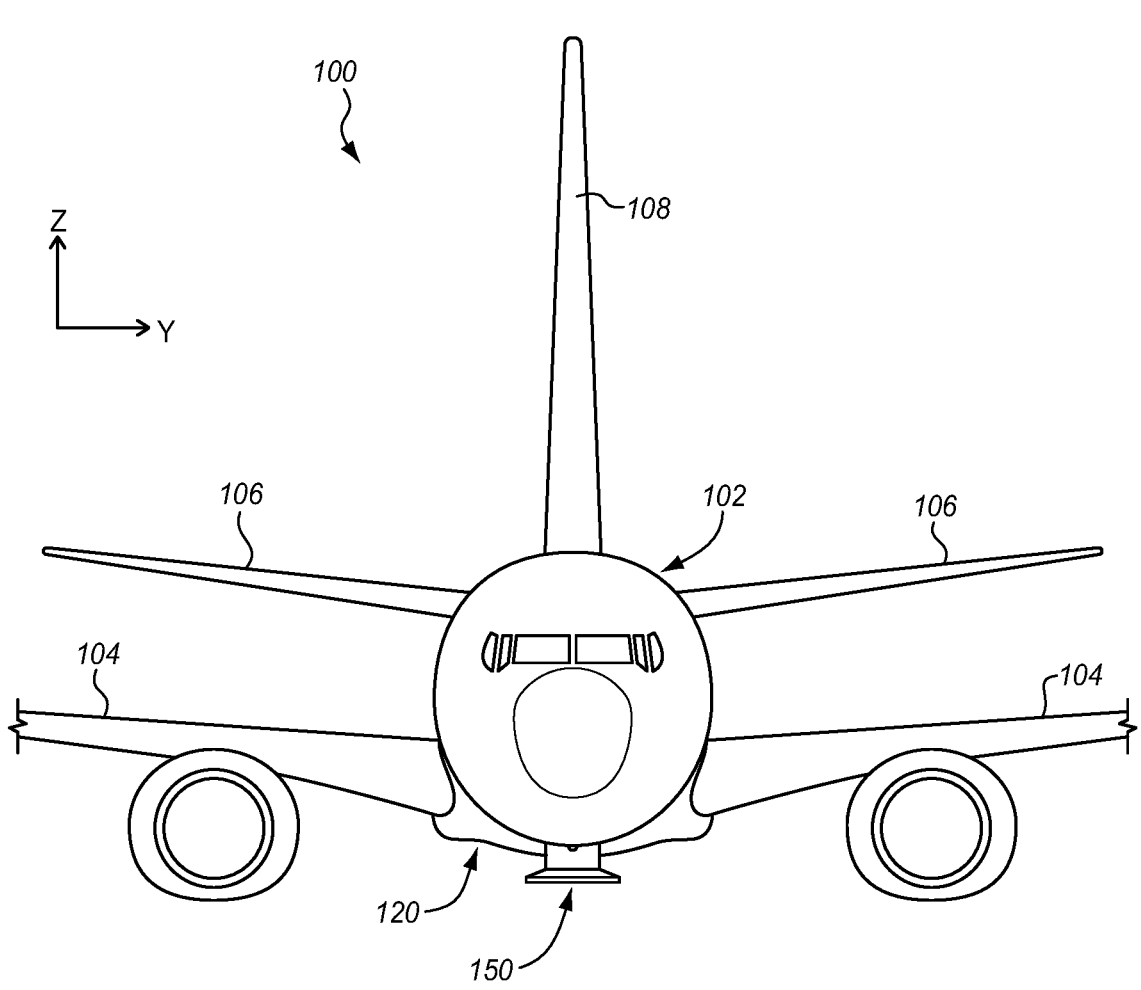
FIG. 1A is a front view of an aircraft.

FIG. 1A is a front view of an aircraft 100. The aircraft 100 includes a fuselage 102, wings 104, horizontal stabilizers 106, and a vertical stabilizer 108. A lower surface 120 of the fuselage 102 includes a mission pod 150 attached to its external surface. The mission pod 150 may house various components or payload that facilitate execution of various operations. For example, the mission pod 150 may carry weapons or electronics (e.g., communications or surveillance equipment) for mission-specific operations. The mission pod 150 is detachable from the aircraft 100 for mission adaptability. Although one attachment site is shown in FIG. 1, it will be appreciated that the aircraft 100 may include alternative or multiple attachment locations on aircraft 100 for swapping mission pods 150 on the external body of the aircraft 100.

Figure 1B:
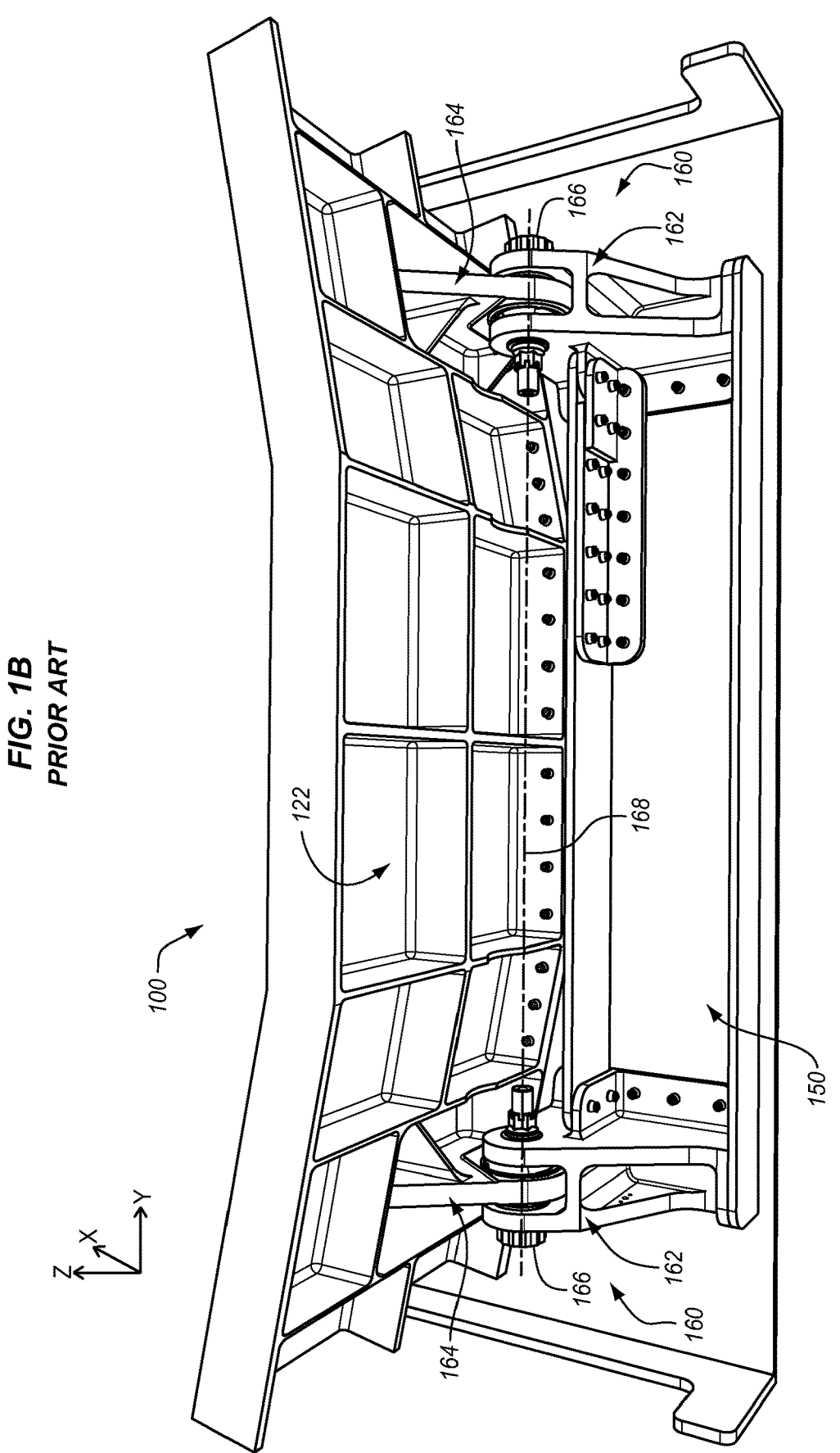
FIG. 1B is a front perspective view of the mission pod attached to an external body of the aircraft via one or more joints.

FIG. 1B is a front perspective view of the mission pod 150 attached to an external body 122 of the aircraft 100 via one or more joints 160. In particular, the joints 160 may comprise clevis and lug fittings. The clevis 162 is a component or structure of the mission pod 150 and includes a yoke structure, or forks, with a concentrically aligned pair of holes. The lug 164 is a component or structure of the aircraft 100 and includes a projecting piece with a hole that is configured to situate between the pair of holes of the clevis 162. Thus, the mission pod 150 may be detachably coupled with the aircraft 100 by installing a bolt 166 through the aligned holes of the clevis 162 and lug 164. In this example, a front end of the mission pod 150 is attached with two joints 160, or two clevis and lug fittings, disposed at a left side and right side.

Unfortunately, manufacturing tolerances of the aircraft 100 may sometimes result in slight misalignment of left/right lugs 164. Similarly, slight manufacturing variation of a mission pod 150 may introduce slight misalignment between left/right devises 162. Accordingly, after coupling one clevis 162 and lug 164 via bolt 166 (e.g., at right side) to establish a joint axis 168, the other clevis 162 and lug 164 (e.g., at left side) may be undesirably offset with respect to each other and the joint axis 168. For this reason, joints 160 are sometimes match drilled or fitted with complex link assemblies. However, match drilling is time consuming and necessitates coordinated tooling and drilling that is not compatible with easily swapping mission pods 150. Match drilling also eliminates interchangeability of mission pods 150 since their attachment becomes limited to the aircraft and specific attachment location to which it has been match drilled. Link assemblies add complexity to installing and removing mission pods 150 and are only able to transmit loads in a single vector along the length of the link.

Figure 2:
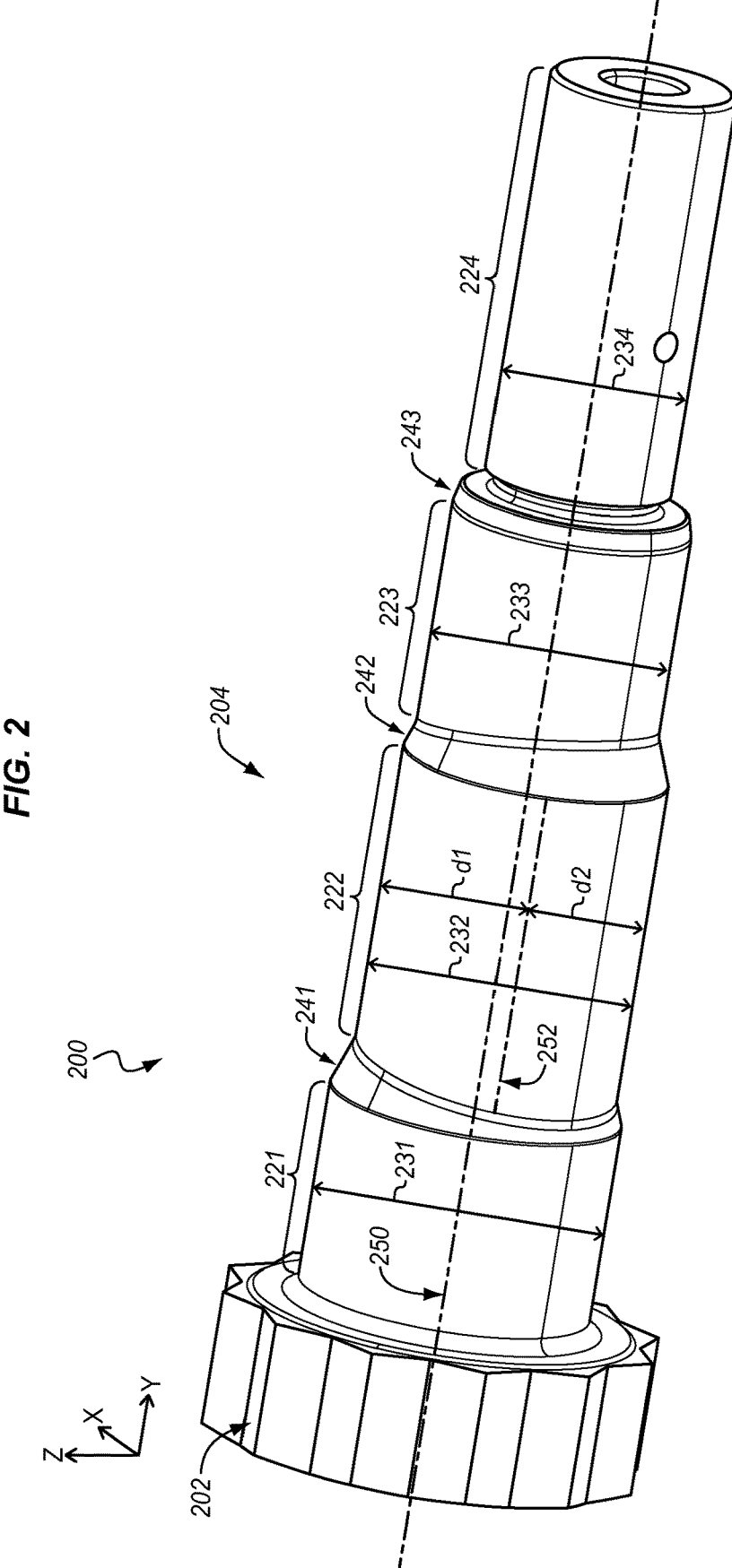
FIG. 2 is a perspective view of an eccentric bolt in an illustrative embodiment.

FIG. 2 is a perspective view of an eccentric bolt 200 in an illustrative embodiment. The eccentric bolt 200 is configured to install through a joint to correct misalignment. For example, with reference to FIG. 1B, the eccentric bolt 200 may be installed through the clevis 162 and lug 164 (e.g., at left side) to correct misalignment therein after coupling clevis 162 and lug 164 via bolt 166 (e.g., at right side). As described in greater detail below, rotation of the eccentric bolt 200 as it is inserted through the joint 160 compensates for misalignment in the joint 160. Advantageously, the eccentric bolt 200 facilitates quick, secure attachment of the mission pod 150 to the aircraft 100 in a compact size without drilling or complex link assemblies. Additionally, the eccentric bolt 200 is advantageously configured to react loads in multiple directions perpendicular to the axial direction of the eccentric bolt 200.

The eccentric bolt 200 includes a head 202 and a shank 204. The shank 204 includes multiple shank sections 221-224 that successively decrease in diameter in an axial direction from the head 202 toward a tail end of the shank 204. One of the shank sections 221-224 is an eccentric shank section 222 that is eccentric with respect to a center axis 250 of the shank 204. The eccentric shank section 222 has an axis of rotation 252 that is off center with respect to the center axis 250 of the shank 204. Therefore, as the eccentric bolt 220 rotates around the center axis 250 an outer circumferential position of the eccentric shank section 222 changes with respect to the center axis 250.

In one embodiment, the shank sections 221-224 include: an upper shank section 221 that is concentric and has a first diameter 231, the eccentric shank section 222 that is eccentric and has as second diameter 232 smaller than the first diameter, a lower shank section that is concentric and has a third diameter 233 smaller than the second diameter, and a bottom shank section 224 that is concentric and has a fourth diameter 234 smaller than the third diameter 233. Moreover, the eccentric shank section 222 and its second diameter 232 include different distances, d1 and d2, from the center axis 250 of the shank 204 to its outer circumference. In other words, the eccentric shank section 222 includes an offset axis from the center axis 250. Accordingly, the eccentric shank section 222 occupies a different offset area as the eccentric bolt 200 is rotated about the center axis 250. Additionally, the shank 204 includes multiple ramps 241-243 to taper the diameter between adjacent ones of the shank sections 221-224. The eccentric shank section 222 is thus configured to compensate for misalignment in a joint as described in greater detail below.

Figure 3:
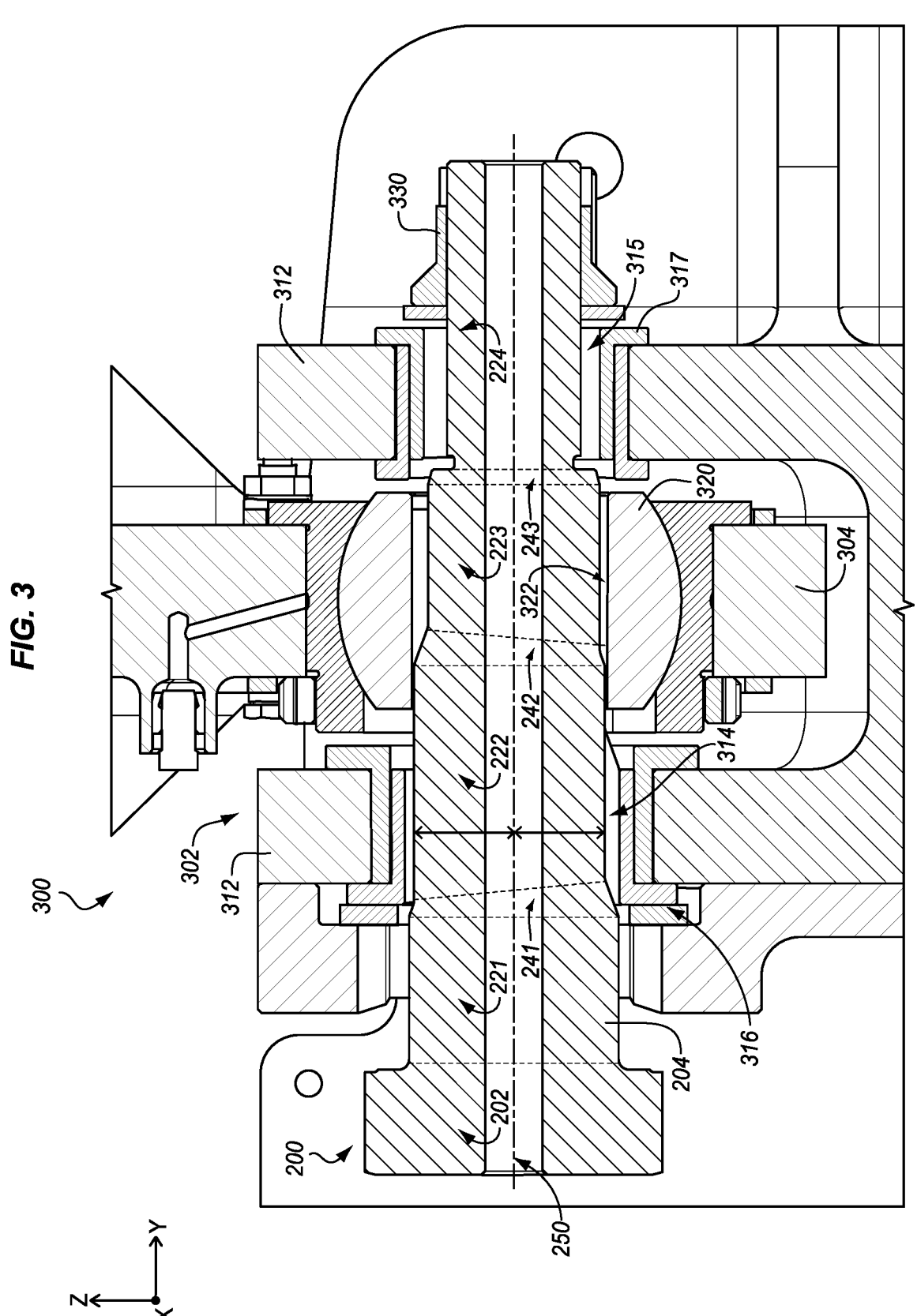
FIG. 3 is a side cross-sectional view of the eccentric bolt partially inserted through a clevis and lug fitting in an illustrative embodiment.

FIG. 3 is a side cross-sectional view of the eccentric bolt 200 partially inserted through a clevis and lug fitting 300 in an illustrative embodiment. The clevis and lug fitting 300 includes a clevis 302 and a lug 304. In some embodiments, the clevis 302 is a component or structure of a mission pod (e.g., mission pod 150) and includes a yoke structure, or forks 312, with a concentrically aligned pair of holes 314-315. The pair of holes 314-315 extend through a respective pair of bushings 316-317 situated in the forks 312, and the first hole 314 may be larger in diameter than the second hole 315. The lug 304 may be a component of an aircraft at which an external structure (e.g., mission pod 150) is detachably coupled. The lug 304 may include a hole 322 that is configured to situate/align between the pair of holes 314-315 of the clevis 302 with a diameter that is a size between the diameters of the pair of holes 314-315. The hole 322 may include a passage extending through a bearing 324, such as a spherical ball bearing or plane bearing, of the lug 304 to prevent twisting forces acting upon the lug 304. Generally, as described in greater detail below, the eccentric bolt 200 is configured to engage in a fit through the holes of the clevis and lug fitting 300 to compensate for misalignment.

In situations in which the clevis and lug fitting 300 includes slight misalignment due to manufacturing tolerances (e.g., the hole 316 of the lug 304 is misaligned with the pair of holes 314-315 of the clevis 302), a regular straight bolt may not correctly align/install unless on-site drilling is performed which typically slows and complicates installation. By contrast, the eccentric bolt 200 advantageously enables fine adjustment in the clevis and lug fitting 300 by rotating as the shank sections 221-224 engage corresponding areas of the clevis and lug fitting 300. In particular, the upper shank section 221 is concentric and sized to correspond with a first hole 314 of the clevis 302, the eccentric shank section 222 is eccentric and sized to correspond with the bearing 324 of the lug 304, the lower shank section 223 is concentric and sized to correspond with the second hole 315 of the clevis 302, and the bottom shank section 224 is concentric and may be threaded for securing a nut 330.

As shown in FIG. 3, the shank sections 221-224 are sized such that the eccentric shank section 222 is configured to engage the bearing 320 of the lug 304 before the upper shank section 221 engages the first hole 314 of the clevis 302 and before the lower shank section 223 engages the second hole 315 of the clevis 302. This advantageously provides a benefit in that, with the eccentric shank section 222 engaged before the upper shank section 221 and the lower shank section 223, the eccentric shank section 222 is configured to secure a centerline of the lug 304 to enable vertical adjustment of the clevis 302 with respect to the lug 203, and to enable rotation of the eccentric bolt 200 until the eccentric bolt 200 fits through the clevis and lug fitting 300 to compensate for the misalignment.

Additionally, the eccentric bolt 200 includes multiple ramps 241-243 configured to facilitate alignment of the eccentric bolt 200 with respect to the clevis and lug fitting 300 as the eccentric bolt 200 is partially inserted and rotated. One of the ramps 241-243 is an eccentric ramp 242 that tapers the diameter between the eccentric shank section 222 and the lower shank section 223. As the eccentric bolt 200 is partially inserted through the clevis and lug fitting 300, slight misalignment of holes of the clevis and lug fitting 300 may cause the eccentric shank section 222 to resist sliding through the lug 304. The eccentric ramp 242 is configured to guide adjustment of the lug 304 with respect to the clevis 302 so that the eccentric shank section 222 slides into the lug 304. This allows the eccentric bolt 200 to be partially inserted into the lug 304 and rotated to aid further insertion as increased alignment is achieved. The multiple ramps 241-243 are thus configured to start/improve the insertion of the eccentric bolt 200 and indicate which way to rotate the eccentric bolt 200 for self-alignment along with the vertical movement of a mission pod (and its clevis 302) to achieve alignment.

While the eccentric shank section 222 is engaged with the lug 304, the shank 204 of the eccentric bolt 220 is configured to rotate to align the concentric shank sections 221 and 223 with the clevis 302, and to insert through the clevis and lug fitting 300 to compensate for misalignment of the clevis and lug fitting 300. The correctly aligned offset of the eccentric shank section 222 advantageously enables the installed eccentric bolt 200 to react forces in multiple directions (e.g., a vertical z direction and a horizontal x direction) perpendicular to the axial direction (e.g., y direction) of the eccentric bolt 200. The eccentric bolt 200 thus facilitates quick, secure attachment of an external structure (e.g., mission pod 150) to an aircraft in a compact size without drilling. It will be appreciated, however, that the eccentric bolt 200 may be adapted or applied to alternative applications or types of joints.

FIG. 4 is a flow chart illustrating a method 400 of attaching a first structure having a clevis to a second structure having a lug in an illustrative embodiment. The steps of method 400 will be described with respect to the eccentric bolt 200 and clevis and lug fitting 300 of FIGS. 2-3, although one skilled in the art will understand that the methods described herein may be applied to alternative configurations of joints and bolts. The steps of the methods described herein are not all inclusive and may include other steps not shown. The steps for the flow charts shown herein may also be performed in an alternative order.

In step 402, the lug 304 is positioned between forks 312 of the clevis 302 to approximately align respective holes (e.g., approximately align hole 322 with holes 314-315) in an axial direction to form a clevis and lug fitting 300. As earlier described, in some embodiments, the clevis 302 belongs to the first structure or external structure such as a mission pod that is to be assembled or coupled with the lug 304 of a second structure such as an aircraft.

In step 404, the eccentric bolt 200 is partially inserted through the clevis and lug fitting 300 until an eccentric shank section 222 of the eccentric bolt 200 engages the lug 304. For example, in one embodiment, the eccentric bolt 200 is partially inserted through the clevis and lug fitting 300 until the eccentric ramp 242 engages the lug 304 and resists sliding through the lug 304 due to misalignment of the respective holes of the clevis 302 and the lug 304. In optional step 406, the lug 304 is engaged with the eccentric shank section 222 before engaging the clevis 302 with concentric shank sections (e.g., upper shank section 221 and lower shank section 223) of the eccentric bolt 200.

In step 408, the eccentric bolt 200 is rotated to compensate for horizontal misalignment of the clevis and lug fitting 300. In step 410, the clevis 302 is adjusted vertically to compensate for vertical misalignment of the clevis and lug fitting 300. For example, the entire mission pod may be moved vertically as a rigid body including the clevis 302 to adjust vertical misalignment of the pod clevis and aircraft lug. In step 412, the eccentric bolt 200 is inserted further through the clevis and lug fitting 300 to engage the clevis 302 with the eccentric bolt 200 and attach the first structure with the second structure. This enables optional step 414 of installing a keeper on the eccentric bolt 200 to prevent the eccentric bolt 200 from rotating, and optional step 416 of reacting loads with the eccentric bolt 200 in a vertical direction perpendicular to the axial direction of the eccentric bolt 200, and also in a horizontal direction perpendicular to the axial direction of the eccentric bolt 200. That is, a keeper positioned on the head 202 locks the eccentric bolt 200 in the aligned position so that load can be reacted instead of allowing the eccentric bolt 200 to rotate in the joint. Method 400 thus provides a benefit in enabling quick, secure attachment of the first structure to the second structure as compared to prior techniques.

In some embodiments, the eccentric bolt 200 may complete installation using an installation nut (e.g., nut 330). The bottom shank section 224 may include a threaded portion with increased length to sufficiently protrude through the second hole 315 of the clevis 302, allowing a nut to engage the bottom shank section 224 and pull the eccentric bolt 200 through the clevis 302 on installation. For example, the eccentric bolt 200 may be rotated while slightly torquing the installation nut (and/or pushing the eccentric bolt 200) until the eccentric bolt 200 centers or slides onto/through the clevis 302. This may continue until the eccentric bolt 200 is fully seated. In further embodiments, the eccentric bolt 200 may be prevented from rotating in the joint by installing a keeper on the head 202. In yet another embodiment, the eccentric bolt 200 may include a hole drilled through the center axis 250 to be used in conjunction with a tool to remove the eccentric bolt 200 from the clevis 302 during decoupling.

Figure 5:
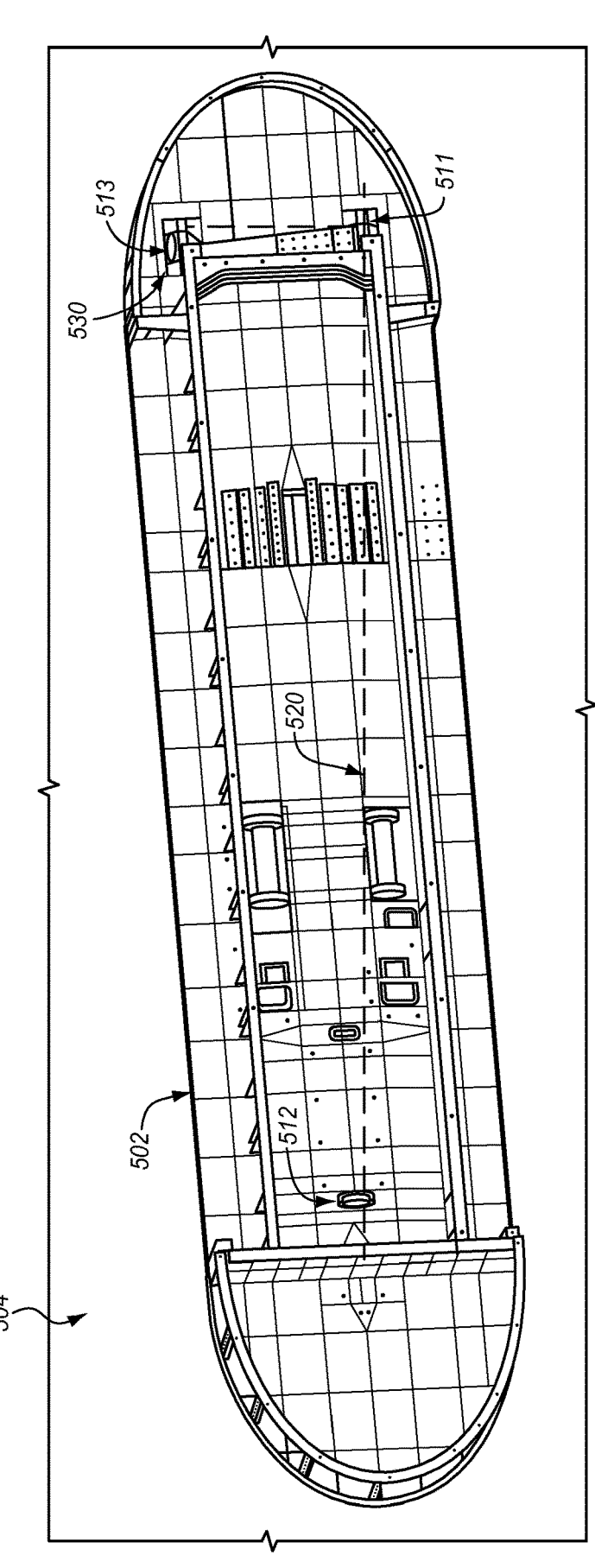
FIG. 5 is a bottom view of a mission pod attached with an aircraft in an illustrative embodiment.

FIG. 5 is a bottom view of a mission pod 502 attached with an aircraft 504 in an illustrative embodiment. In particular, the mission pod 502 is attached via installations 511-513. Moreover, the installations 511-513 may be secured in order of their numerical element (e.g., installation 511 is secured first, installation 512 is secured second, etc.). For example, the installations 511-513 may include bolt installations installed in order. After the first installation 511 and the second installation 512 are secured, a line of rotation 520 is established that may cause a misaligned axis 522 between the first installation 511 and the third installation 513. Accordingly, steps as further described in FIG. 6 may be performed to correct the misalignment. After the eccentric bolt 200 is aligned and seated in the third installation 513, a keeper 530 may be installed on the eccentric bolt 200 to hold the alignment and allow the third installation to react loads in multiple directions perpendicular to an axial direction of the eccentric bolt 200. The keeper 530 may engage the head 202 of the eccentric bolt 200 prior to nut torque to aid installation of the eccentric bolt 200.

Figure 6:
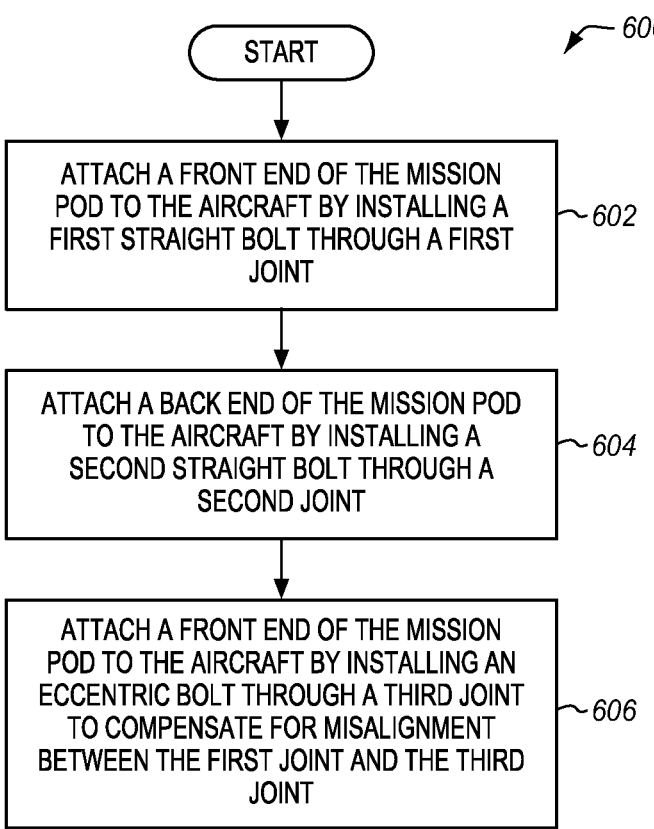
FIG. 6 is a flow chart illustrating a method of attaching a mission pod with an aircraft in an illustrative embodiment.

FIG. 6 is a flow chart illustrating a method 600 of attaching a mission pod with an aircraft in an illustrative embodiment. The steps of method 600 will be described with respect to a mission pod and an aircraft, although one skilled in the art will understand that the methods described herein may be applied to one or more alternative structures to be coupled together. The steps of the methods described herein are not all inclusive and may include other steps not shown. The steps for the flow charts shown herein may also be performed in an alternative order.

In step 602, a first end (e.g., back end) of the mission pod 502 is attached to the aircraft 504 by installing a first straight bolt through a first joint (e.g., first installation 511). In step 604, a second end (e.g., forward end) of the mission pod 502 is attached to the aircraft 504 by installing a second straight bolt through a second joint (e.g., second installation 512). In step 606, the first end of the mission pod 502 is attached to the aircraft 504 by installing the eccentric bolt 200 through a third joint (e.g., clevis and lug fitting 300) to compensate for misalignment between the first joint and the third joint. Step 606 may include, for example, the steps of method 400 earlier described. Accordingly, method 600 advantageously enables quick, secure attachment of a mission pod to an aircraft in a manner that compensates for the misaligned axis 522.

EXAMPLES

Figure 7:
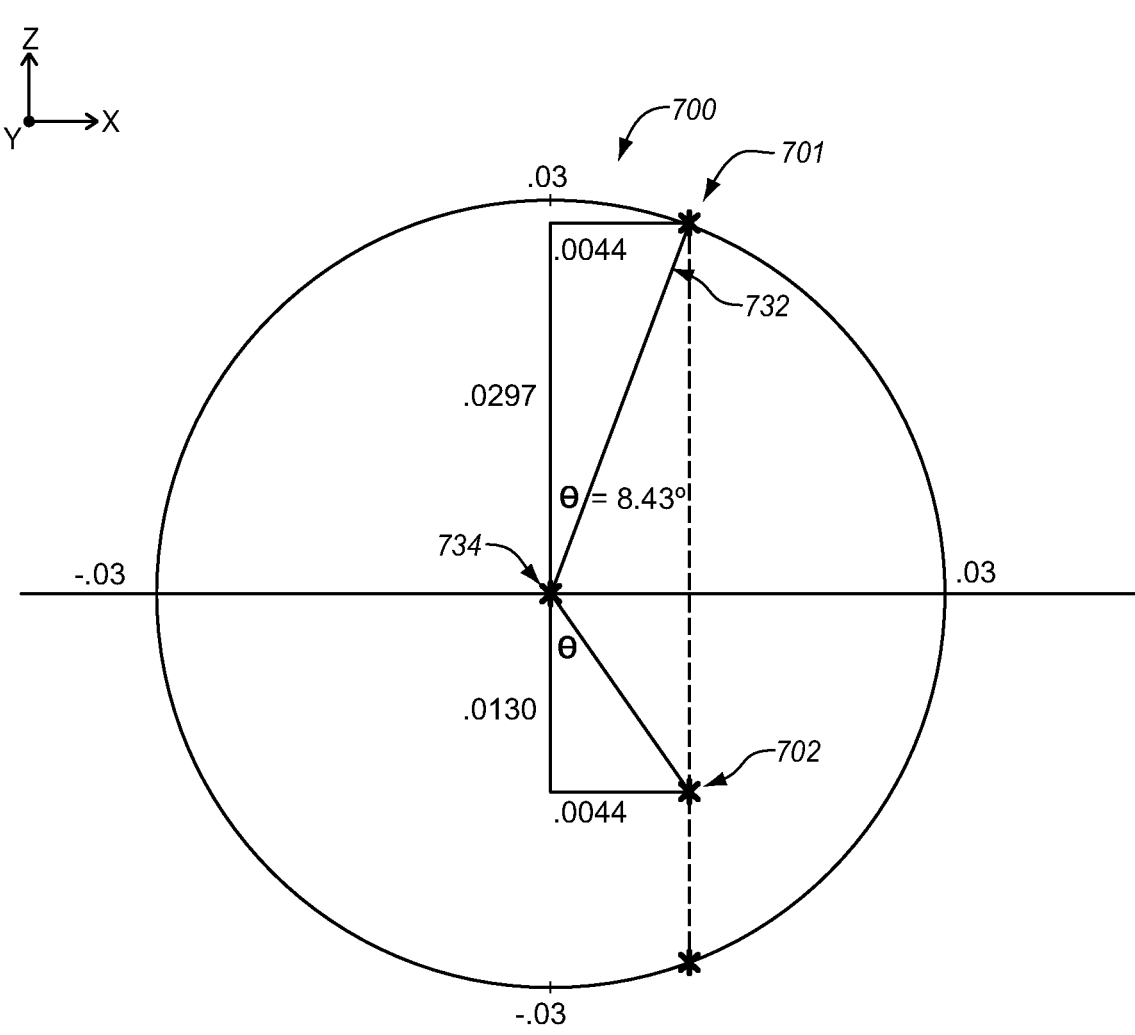
FIG. 7 is a graphical illustration of an example joint misalignment corrected by an eccentric bolt in an illustrative embodiment.

FIG. 7 is a graphical illustration of an example joint misalignment corrected by an eccentric bolt 700 in an illustrative embodiment. Suppose, for this example, that the eccentric bolt 700 includes an offset 732 of 0.0300 inches. With reference to FIG. 2 for example, the eccentric shank section 222 may include an axis of rotation 252 that is offset 0.0300 inches from the center axis 250. Thus, by using the eccentric bolt 700 in a joint, one structure (e.g., mission pod 150) can be adjusted relative to the other structure (e.g., aircraft) by 0.0300 inches relative to a nominal lug location 734.

Specifically, in this example, suppose that left/right lugs of an aircraft are misaligned by 0.0044 inches in an x-direction (e.g., forward/aft direction) and misaligned by 0.0130 inches in a z-direction (e.g., vertical direction). Since the eccentric bolt 700 may be configured, as earlier described, to engage/contact the lug bearing prior to engaging the clevis surfaces, the eccentric bolt 700 is able to rotate (e.g., to take out misalignment in the x-direction) while the pod is adjusted slightly up and down (e.g., to take out misalignment in the z-direction) until alignment is made.

FIG. 7 shows that there are two possible alignment positions to compensate for the misalignment and enable the joint to react loads in multiple directions (e.g., x-z directions) perpendicular to the axial direction (e.g., y-direction) of the eccentric bolt 700. In a first alignment solution 701, the pod is raised 0.0167 inches (i.e., 0.0297 inches–0.0130 inches=0.0167 inches). In a second alignment solution 702, the pod is lowered 0.0427 inches (i.e., 0.0297 inches+0.0130 inches=0.0427 inches). In either case, the alignment is achieved by rotating the eccentric bolt 700 a corresponding amount and the overall height change of one corner of the pod (e.g., length of pod may be approximately 20 feet) is not significant. Thus, to compensate for misalignment in this case, the pod may either by raised 0.0167 inches or lowered 0.0426 inches and the tapered ramps of the eccentric bolt 700 aid in starting the eccentric bolt 700 for installing to the joint quickly, securely, and without drilling.

Although specific embodiments are described herein, the scope of the disclosure is not limited to those specific embodiments. The scope of the disclosure is defined by the following claims and any equivalents thereof.

What is claimed is:

1. An assembly, comprising:
an aircraft having an externally projecting lug containing a bearing having a passage;
a mission pod having a clevis comprising a pair of forks respectively having a first hole and a second hole concentrically aligned with each other, and the first hole is larger in diameter than the second hole;
an eccentric bolt for securing the clevis to the lug to thereby form a clevis and lug fitting detachably coupling the mission pod to the aircraft, the eccentric bolt comprising:
a head; and
a shank comprising:
multiple shank sections that successively decrease in diameter in an axial direction from the head toward a tail end of the shank, wherein one of the shank sections is an eccentric shank section that is off-center with respect to a center axis of the shank, and
multiple ramps tapering the diameter between adjacent ones of the shank sections, and each ramp extends continuously around a circumference of the shank; and
wherein the eccentric shank section is configured to engage the passage of the bearing of the lug prior to engagement of concentric shank sections with the forks of the clevis, and the ramps are configured to allow the shank to be partially inserted into the lug and rotated to aid further insertion of the shank as increased alignment is achieved between the concentric shank sections and the first and second holes in the clevis.

2. The assembly of claim 1 wherein in the axial direction from the head toward the tail end of the shank, the shank sections include:
an upper shank section that is concentric and sized to correspond with the first hole of the clevis,
the eccentric shank section that is eccentric and sized to correspond with the passage of the bearing of the lug; and
a lower shank section that is concentric and sized to correspond with the second hole of the clevis.

3. The assembly of claim 2 wherein:
with the shank sections securely fit within the first and second holes and the passage of the clevis and lug fitting, the eccentric bolt is configured to react loads in a vertical direction perpendicular to the axial direction of the eccentric bolt and to react loads in a horizontal direction perpendicular to the axial direction of the eccentric bolt.

4. The assembly of claim 2 wherein:
one of the ramps is an eccentric ramp that tapers a diameter of the eccentric shank section to the lower shank section.

5. The assembly of claim 4 wherein:
the multiple ramps are configured to facilitate alignment of the eccentric bolt with respect to the clevis and lug fitting.

6. The assembly of claim 2 wherein the shank further includes:
a bottom shank section that is concentric and threaded for securing a nut.

7. The assembly of claim 2 wherein:
the shank is sized such that the eccentric shank section is configured to engage the bearing of the lug before the upper shank section engages the first hole of the clevis and before the lower shank section engages the second hole of the clevis.

8. The assembly of claim 7 wherein:
with the eccentric shank section engaged before the upper shank section and the lower shank section: the eccentric shank section is configured to secure a centerline of the lug to enable vertical adjustment of the clevis with respect to the lug, and to enable rotation of the eccentric bolt until the eccentric bolt fits through the clevis and lug fitting to compensate for the misalignment.

9. The assembly of claim 1, wherein the lug projects from a fuselage of the aircraft.

10. The assembly of claim 1, wherein the bearing is a spherical ball bearing.

11. A method of attaching a mission pod having a clevis, to an aircraft having a lug, the clevis comprising a pair of forks respectively having a first hole and a second hole concentrically aligned with each other, and the first hole is larger in diameter than the second hole, and the lug is an externally projecting lug containing a bearing having a passage, the method comprising:
positioning the lug between the forks of the clevis to approximately axially align the passage in the bearing with the first and second holes in the clevis to form a clevis and lug fitting;
inserting an eccentric bolt partially through the clevis and lug fitting until an eccentric shank section of a shank of the eccentric bolt engages the lug, and the eccentric bolt has multiple shank sections that successively decrease in diameter in an axial direction from a head toward a tail end of the shank, and the shank sections include concentric shank sections and the eccentric shank section, which is off-center with respect to a center axis of the shank, and the shank includes multiple ramps tapering the diameter between adjacent ones of the shank sections, and each ramp extends continuously around a circumference of the shank;
engaging the eccentric shank section with the passage of the bearing of the lug prior to engaging the concentric shank sections with the forks of the clevis;
rotating the shank of the eccentric bolt to align the concentric shank sections with the first and second holes in the clevis;
bearing the ramps against edges of the first and second holes while rotating the shank as increased alignment is achieved between the concentric shank sections and the first and second holes in the clevis; and
inserting the eccentric bolt further through the clevis and lug fitting in a manner compensating for misalignment between the passage and the first and second holes, to engage the clevis with the eccentric bolt and thereby attach the mission pod to the aircraft.

12. The method of claim 11 further comprising:
installing a keeper on the eccentric bolt to prevent the eccentric bolt from rotating;
reacting loads with the eccentric bolt in a vertical direction perpendicular to the axial direction of the eccentric bolt; and
reacting loads with the eccentric bolt in a horizontal direction perpendicular to the axial direction of the eccentric bolt.

13. The method of claim 11 wherein the eccentric shank section includes an eccentric ramp that tapers a diameter of the eccentric shank section, the method further comprising:
inserting the eccentric bolt partially through the clevis and the lug until the eccentric ramp engages the lug and resists sliding through the lug due to misalignment between the first and second holes and the passage respectively of the clevis and the lug.

14. The method of claim 11, further comprising:
attaching a first end of the mission pod to the aircraft by installing a first straight bolt through a first joint;
attaching a second end of the mission pod to the aircraft by installing a second straight bolt through a second joint; and
attaching the first end of the mission pod to the aircraft by installing the eccentric bolt through the clevis and lug fitting, which is a third joint for attaching the mission pod to the aircraft, and the installation of the eccentric bolt compensates for misalignment between the first joint and the third joint.

15. The method of claim 14 further comprising:
rotating the eccentric bolt to compensate for horizontal misalignment between the first joint and the third joint; and
adjusting the clevis vertically to compensate for vertical misalignment between the first joint and the third joint.

16. The method of claim 11, wherein in the axial direction from the head toward the tail end of the shank, the shank sections include:
an upper shank section that is concentric and sized to correspond with the first hole of the clevis,
the eccentric shank section that is eccentric and sized to correspond with the passage of the bearing of the lug; and
a lower shank section that is concentric and sized to correspond with the second hole of the clevis.

17. The method of claim 16, wherein the multiple ramps include an eccentric ramp that tapers a diameter of the upper shank section to the eccentric shank section.

18. The method of claim 17, wherein:
the multiple ramps are configured to facilitate alignment of the eccentric bolt with respect to the clevis and lug fitting.

19. The method of claim 11, wherein the shank further includes:
a bottom shank section that is concentric and threaded for securing a nut.

20. The method of claim 11, wherein the step of inserting the eccentric bolt through the clevis and lug fitting in a manner compensating for misalignment between the passage and the first and second holes comprises:
vertically adjusting the clevis with respect to the lug, and rotating the eccentric bolt until the eccentric bolt fits through the passage and the first and second holes of the clevis and lug fitting.

* * * * *